Feb. 28, 1950          D. D. GRIEG          2,498,676
CALIBRATION APPARATUS FOR RADIO RECEIVERS
Filed April 9, 1945
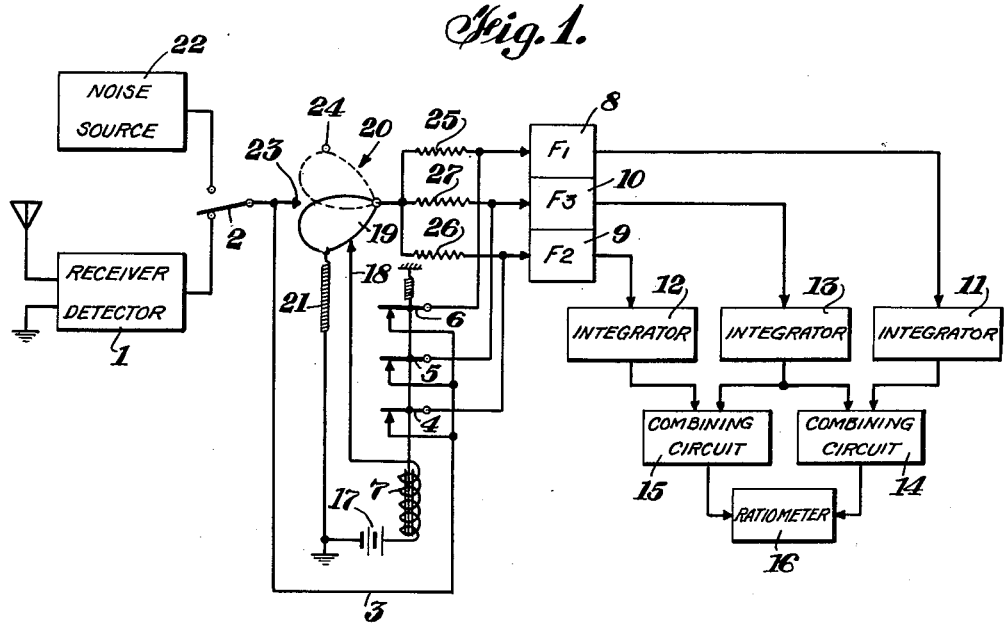
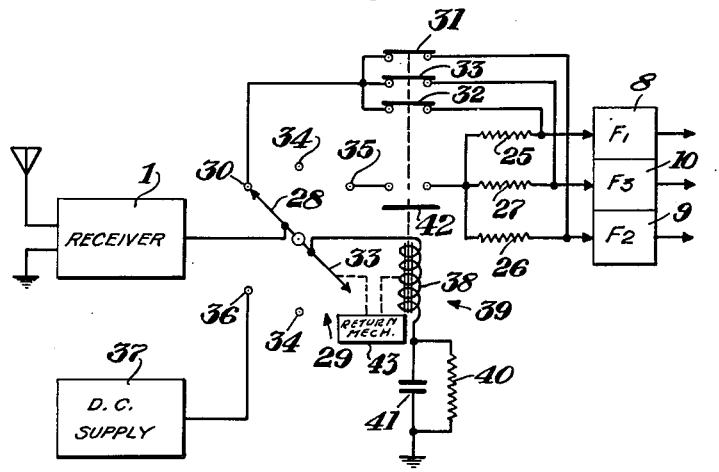
INVENTOR.
DONALD D. GRIEG
BY
*R P Morris*
ATTORNEY Patented Feb. 28, 1950

2,498,676

UNITED STATES PATENT OFFICE 2,498,676

CALIBRATION APPARATUS FOR RADIO RECEIVER

Donald D. Grieg, Forest Hills, N. Y., assignor to Federal Telephone and Radio Corporation, New York, N. Y., a corporation of Delaware Application April 9, 1945, Serial No. 587,243

8 Claims. (Cl. 343—101)

This invention relates to calibration systems and more particularly to a method and means for calibrating a particular form of radio beacon receiver.

In certain proposed beacon receiver systems, indications are produced by comparing the amplitude ratios of two or more signals of a given frequency or frequencies. Such an indicating system, for example, is embodied in the radio receiver, more particularly described in connection with the radio beacon and receiver system shown as an example in the copending application of Emile Labin and applicant, Serial No. 581,974, filed March 10, 1945, now Patent No. 2,485,612 granted October 25, 1949. With such indicating apparatus, it is desirable to provide a system for checking the calibration adjustment of the instrument and indicating if the equipment is properly operating.

It is an object of my invention to provide a simple ready operable system for testing the calibration and operation of an indicator by comparing the amplitude of two or more signals of a given frequency.

It is a further object of my invention to provide a system utilizing component frequencies applied in a given amplitude ratio to a ratiometer indicating apparatus for the purpose of testing the calibration and operation of the indicator.

It is a still further object of my invention to provide in a system wherein signals to be translated are selected and integrated and thereafter applied to a ratiometer, a system for applying a test wave having the frequency signal components thereof in a predetermined amplitude ratio to the system through filters and integrating circuits for the purpose of testing the operation and calibration of the ratiometer.

It is a still further object of my invention to provide in a receiver circuit for comparing amplitude ratios of two or more signals applied for a given interval of time, a system for checking the calibration and operation of the indicator by applying for a given interval of time a test signal having the component frequencies of the signal therein, and selecting these component frequencies for application to the indicator during this period.

According to a feature of my invention, I provide in a receiving circuit adapted to separate received signal components of predetermined frequencies and apply them through parallel connected filter circuits and integrating circuits to a ratiometer, a system wherein noise energy or other energy including the component frequencies of said signal is applied to said filters in a predetermined amplitude relation while disconnecting or disabling the receiving circuit from receiving the normal signal frequencies.

A better understanding of my invention and the objects and features thereof may be had from the specific description of particular embodiments thereof made with reference to the accompanying drawings, in which:

Fig. 1 illustrates an embodiment of a radio receiver to which my invention has been applied; and Fig. 2 illustrates an alternative arrangement which may be used in the system of Fig. 1.

In Fig. 1 is shown a translator unit 1 which may be a radio receiver which serves to receive and detect to audio or video frequencies of a received carrier wave. The received wave is preferably one which is applied periodically to the receiver, for example, a rotating omnidirectional radio beam of the type described in the aforementioned application, Serial No. 581,974. The audio frequency output from the receiver may be applied over a switch 2, lead 3 and relay contacts 4, 5 and 6 of relay 7, to separate filters 8, 9 and 10 tuned to select three signal components at frequencies F1, F2 and F3. These signal frequency components are applied to individual integrator circuits 11, 12, and 13 and from there to combining circuits 14 and 15 which serve to subtract the integrated output from integrator 13 from the outputs of integrators 11 and 12 respectively. These integrated outputs are then applied to ratiometer 16. In the system as described, the radio beam carrier signal frequency components F1 and F2 vary in amplitude in accordance with the direction of the beam. Accordingly, the indication produced on ratiometer 16 will give an indication of the azimuth position of the receiver with respect to a rotatable radio beacon of the type described. It will be noted that the relay contacts 4, 5 and 6 are normally maintained closed so that the energy from the output of receiver 1 is applied in parallel to the selecting filters 8, 9 and 10. Relay winding 7 is energized from battery 17 through switch contact 18 and switch blade 19 of a switch 20 and switch return spring 21 to the negative side of the battery.

If calibration or operation of meter 16 is desired, switch 2 may be thrown from its lower to its upper contact applying energy from a noise source 22 to a second contact 23 as well as to filters 8, 9 and 10. Noise source 22 produces a wave having component frequencies preferably of substantially equal amplitude at the same frequencies as the signal components normally incoming over receiver 1. This noise energy, however, must be applied to the indicating circuit for a limited period of time in order to simulate the normal beam reception. Accordingly, when switch 2 is thrown to its upper position, switch blade 19 is moved past contact 23 to a stop 24. As soon as switch blade 19 is moved away from contact 18, relay coil 7 becomes de-energized releasing contacts 4, 5 and 6 and interconnecting filters 8, 9 and 10 over resistance elements 25, 26 and 27 to switch blade 19. These resistance elements preferably are adjusted as a voltage divider so that the noise energy from source 22 is applied at predetermined amplitude levels to the individual filters 8, 9 and 10 while contact blade 20 is passing over contact 23.

Accordingly, the selected components will be applied in a predetermined amplitude level over integrators 11, 12 and 13 and combining circuits 14 and 15 to ratiometer 16. The resistance values of voltage divider resistors 25, 26 and 27 are preferably so chosen that the meter will be adjusted to indicate an angle such that all three frequency components F1, F2 and F3 would normally be present. If the meter does not move to the proper calibrating position adjustments may be made to correct the calibration.

Spring 21 may be so adjusted that blade 19 is always returned to its initial position at a substantially constant rate of speed. Accordingly, readings on the ratiometer may be made upon the return of switch blade 19 so that the speed at which the switch blade is moved past the contact 23 in the initial operation will affect the apparent beam width produced thereby.

It will be clear that once switch blade 19 is released it will again return into engagement with contact 18, and again energizing relay coil 7 thereby returning the receiver to its normal operating condition.

While I have illustrated a separate noise source 22 for the calibration operation, it will be clear that a separate source of this kind is not necessary. By detuning receiver 1 from the normal received signal frequency, the receiver will itself serve as a source of noise energy for the testing and calibration operation. It will be further appreciated that in addition to checking the calibration of instrument 16, the testing operation serves to indicate to the operator that the circuit is in operative condition even though the receiver may be completely out of the field of any radio beacon. The meter 16 would normally not move or show a "line" indication when the receiver is out of the field of a signal transmitter, but by operating the calibrating circuit the operator can be certain that the system is properly in operation.

In Fig. 2 is shown an alternative arrangement which may be used intermediate receiver 1 and filter circuits 8, 9 and 10 of Fig. 1. In this arrangement the output from the receiver 1 is connected through a blade 28 of a two-pole, three-position switch 29 and through a contact 30 of such switch to the normally closed relay contacts 31, 32 and 33 to the inputs of the respective filters 8, 9 and 10. In this condition the receiver operates normally to receive beacon signals. When it is desired to check the calibration of the receiver, receiver 1 may be detuned so as to become a source of noise or calibrating signal energy. Switch blades 28 and 33 of switch 29 may be operated through intermediate contacts 34 in which the receiver is disconnected from the indicating instrument, to a position so that blade 28 is in contact with switch contact 35 and blade 33 in contact with switch contact 36. In this position, a D. C. supply 37 is connected through contact 36 and contact blade 33 to the winding 38 of a relay 39. Winding 38 is connected through a time constant circuit comprising a resistance 40 and a condenser 41 to ground to that the release of this relay will occur after a predetermined time interval depending upon the time constant. At the same time a blade 28 connects through contact 35 and upon energization of relay coil 39 the relay plunger operates to close contact 42 connecting the receiver through resistance elements 25, 26 and 27 to the inputs of filters 8, 9 and 10.

At the same time relay 39 serves to close contact 42, contacts 31, 32 and 33 are opened so that the filters are no longer directly connected in parallel but are connected through the voltage dividing resistors as explained above. Switch 29, upon release, is immediately returned to its normal unoperated condition by means of the return mechanism 43 as shown in the drawing. The mechanism 43 may be spring actuated. Because of the time constant circuit 41 of the operation relay, the noise energy will be applied for a predetermined fixed length of time depending upon the time constants of this circuit regardless of the speed at which the switch is operated. Accordingly, with this system, the testing and calibrating signals are applied for a constant length of time to the indicator thus simulating a beam of constant width.

While I have described above two simple embodiments of my invention, it will be clear that those skilled in the art will be readily able to substitute other types of systems for the specific ones shown. The particular examples given are intended for illustrative purposes only and are not to be considered as a limitation of my invention as set forth in the objects thereof and in the accompanying claims.

I claim:

1. In a translator provided with means for translating a signal including components of different frequencies, means for selecting said different frequency components, means for coupling said translator to said selecting means, and means for comparing said selecting signals; a system for checking operation and calibration of said system comprising a source of energy having components of said different frequencies switch means for disconnecting said coupling to said selecting means and intercoupling said selecting means through a voltage dividing means, and other switch means for connecting said source of energy to said voltage dividing means, whereby energy of said different frequency components will be selected, and applied at predetermined voltage levels to the comparing means.

2. In a receiver provided with means for receiving a periodic signal including components of different audio frequencies, filter means for selecting said different audio frequency components, leads for connecting said receiver to said filter means in parallel, and a ratiometer for comparing said selected signals; a system for checking operation and calibration of said system comprising a source of audio frequency including said different audio frequency components, switch means for disconnecting said parallel connections to said filters and interconnecting said filters through a voltage dividing circuit, and other switch means for connecting said source of energy to said voltage dividing circuit, whereby energy of the frequencies of said components will be selected, and applied at predetermined voltage levels to said ratiometer.

3. In a receiver provided with means for receiving a periodic signal including components of different audio frequencies, filter means for selecting said different audio frequency components, leads for connecting said receiver to said filter means in parallel, integrator means for integrating said selected components during the receiving periods, and a ratiometer for comparing said integrated signals; a system for checking operation and calibration of said system comprising a source of audio frequency noise energy, switch means for disconnecting said parallel connections to said filters and interconnecting said filters through a voltage dividing circuit, and other switch means for connecting said source of noise energy to said voltage dividing circuit, whereby noise energy of the frequencies of said components will be selected, and applied at predetermined voltage levels to said integrator means and said ratiometer.

4. A system according to claim 3 wherein said source of noise energy comprises said receiver, detuned from the carrier frequency of said signals.

5. In a receiver provided with means for receiving a periodic signal including components of different audio frequencies, filter means for selecting said different audio frequency components, leads for connecting said receiver to said filter means in parallel, integrator means for integrating said selected components during the receiving periods, and a ratiometer for comparing said integrated signals; a system for checking operation and calibration of said system comprising a source of noise energy, switch means for disconnecting said parallel connections to said filters and interconnecting said filters through a voltage dividing circuit, and other switch means for connecting said source of noise energy to said voltage dividing circuit for a predetermined interval, whereby noise energy of the frequencies of said components will be selected, and applied at predetermined voltage levels for a predetermined interval to said integrator means and said ratiometer.

6. A system according to claim 5, wherein said last-named switch means comprises means for moving said switch to make said connections and means for returning said switch to normal position upon release.

7. A system according to claim 5, wherein said switch means comprising a contact blade of appreciable width arranged to move past a contact to provide said predetermined interval of connection.

8. A system according to claim 5, wherein said last-named switch means comprises a relay operating the switch contacts, and a time constant circuit for maintaining said relay operative for said predetermined interval.

DONALD D. GRIEG.

REFERENCES CITED

The following references are of record in the file of this patent:

UNITED STATES PATENTS

| Number | Name | Date |
| --- | --- | --- |
| 1,673,173 | Worrall | June 12, 1928 |
| 1,781,363 | Bruce | Nov. 11, 1930 |
| 2,170,515 | Dionne et al. | Aug. 22, 1939 |
| 2,207,620 | Hilferty | July 9, 1940 |
| 2,253,975 | Guanella | Aug. 26, 1941 |
| 2,393,856 | Collins | Jan. 29, 1946 |

FOREIGN PATENTS

| Number | Country | Date |
| --- | --- | --- |
| 549,186 | Great Britain | Nov. 10, 1942 |